US007880327B2

(12) United States Patent
Giacomin

(10) Patent No.: US 7,880,327 B2
(45) Date of Patent: Feb. 1, 2011

(54) SAFETY LOCK

(75) Inventor: Fabrice Giacomin, Creteil Cedex (FR)

(73) Assignee: Valeo Securite Habitacle, Creteil Cedex (FR)

( * ) Notice: Subject to any disclaimer, the term of this patent is extended or adjusted under 35 U.S.C. 154(b) by 79 days.

(21) Appl. No.: 12/093,979

(22) PCT Filed: Nov. 20, 2006

(86) PCT No.: PCT/FR2006/002542

§ 371 (c)(1),
(2), (4) Date: May 16, 2008

(87) PCT Pub. No.: WO2007/057575

PCT Pub. Date: May 24, 2007

(65) Prior Publication Data

US 2008/0236222 A1 Oct. 2, 2008

(30) Foreign Application Priority Data

Nov. 18, 2005 (FR) .................................. 05 11691

(51) Int. Cl.
*B60R 25/04* (2006.01)

(52) U.S. Cl. .................................................... 307/10.3

(58) Field of Classification Search ................. 307/10.3
See application file for complete search history.

(56) References Cited

U.S. PATENT DOCUMENTS 4,315,160 A * 2/1982 Levine ...................... 307/10.3
6,958,551 B2 * 10/2005 Janssen ..................... 307/10.3
7,355,299 B2 * 4/2008 Ghabra et al. .............. 307/10.3

FOREIGN PATENT DOCUMENTS

| | | |
|---|---|---|
| DE | 39 21 893 | 1/1990 |
| DE | 195 47 199 | 6/1997 |
| DE | 198 36 968 | 2/2000 |
| EP | 0 730 072 | 9/1996 |
| EP | 0 818 596 | 1/1998 |
| EP | 1 067 260 | 1/2001 |
| FR | 2 810 776 | 12/2001 |

OTHER PUBLICATIONS

International Search Report issued in PCT/FR2006/002542 w/translation, mailed on Mar. 27, 2007, 6 pages.

Written Opinion issued in PCT/FR2006/002542, mailed on Mar. 27, 2007, 5 pages.

* cited by examiner

*Primary Examiner*—Michael Rutland Wallis
(74) *Attorney, Agent, or Firm*—Osha Liang LLP

(57) ABSTRACT

A key-operated lock device having a lock, a key operable to actuate said lock, an electronic system commanded by said key, an electric power supply communicating electric power necessary to operate said electronic system, and a detection system for detecting the presence or absence of said key. The detection device is operable to command the connection with the electric power supply of said electronic system only if the key is present in, or close to, the lock.

14 Claims, 2 Drawing Sheets

SAFETY LOCK

TECHNICAL FIELD OF THE INVENTION

The subject of the invention is a key-operated lock comprising a means for detecting the presence of the key inside the lock.

It is especially suitable most particularly but not exclusively for antitheft bolts, in particular for switching on or off at least one unit of operation of a motor vehicle for which it is important to know whether the key is inside or outside the lock.

It applies in a particularly advantageous manner in the case where, for example, it may be important to trigger a particular electronic sequence of verifying in advance mechanically, pneumatically, electronically or by the measurement of electromagnetic signals whether the key is positioned inside the lock.

It relates mainly to the motor vehicle field where it is important to switch off the electric power supply of the circuit commanding the starting of the engine if the key is not inserted into the lock. Specifically, a failure of a command member in active position could permanently command the operation of the starter which could cause serious problems.

DESCRIPTION OF THE PRIOR ART

On a steering antitheft element for example, electric switching has a safety aspect. Specifically, a switching problem may have dramatic consequences for the user of the vehicle (fire, accident, etc.). In general, the engine is switched off only via the antitheft element (returning the antitheft element to the "stop" position which switches off all power).

Generally, motor vehicle antitheft bolts may use flexible-blade switches sensitive to magnetic fields (here called ILS switches). These switches are also called ILSs or reed envelopes. These switches are sensitive to the position after rotation of the key but not to the presence or absence of the key.

These switches have the disadvantage of having as a "preferred" failure mode a permanent sticking of the blades because their contact elements tend to stick in the closed position (electric arc during closure of the contact).

It is very difficult to improve this reliability without greatly increasing the price, and/or the volume occupied. The criteria of price and space requirement are extremely important in current fields of industry such as motor vehicles or aviation for example.

OBJECT OF THE INVENTION

The object of the present invention is to remedy these major disadvantages by proposing a device that is especially well suited to improving the reliability of a command system while taking account of the presence or absence of a key in a lock to command or disable the electric power supply to this command system.

Accordingly it proposes a key-operated lock device comprising:

- a lock,
- a key designed to actuate said lock,
- an electronic system commanded by said key,
- an electric power supply communicating the electric power necessary to operate said electronic system.

According to the invention, this lock also comprises a means for detecting the presence or absence of said key, this means commanding the connection with the electric power supply of said electronic system only if the key is present in, or close to, the lock.

Advantageously, the following features may be incorporated into the device described above:

- the means for detecting the presence or absence of said key comprises an electric contact which is placed in the closed position when the key is inserted into the lock,
- the means for detecting the presence or absence of said key comprises the movement of a small magnetic weight closing a relay sensitive to magnetic fields such as a reed envelope for example,
- said small magnetic weight closing a relay sensitive to magnetic fields is incorporated into the key itself,
- said small magnetic weight (M) closing a relay sensitive to magnetic fields is incorporated into the antitheft element itself,
- the means for detecting the presence or absence of said key is incorporated inside a motor vehicle antitheft bolt comprising a rotor that can rotate about an axis inside a stator and move longitudinally along this axis or angularly, the rotor comprising a magnetic weight which, by moving, closes one or more reed envelopes such that when the key is inserted into the rotor, said key moves the rotor and the magnetic weight in translation or in an angular fashion which has the effect of closing a relay commanding the connection to the main power supply,
- the means for detecting the key may also command other functions such as for example the energizing of the ambient lighting or the radio, the GPS system or the telephone,
- the means for detecting the presence of the key is a mechanical system based on a translation moving the magnetic weight longitudinally and making it possible to bring it closer to the reed envelopes that will then be activated by rotation of the bolt of the lock only if the weight has previously been pushed into the lock by the key,
- a second magnet may be added to the first if the arrangement of the reed envelopes makes it necessary and in order to reduce the angle of rotation of the bolt.

It is also advantageous that the means for detecting the presence or absence of said key is incorporated inside a motor vehicle antitheft bolt comprising a rotor that is able to rotate about an axis inside a stator and to move longitudinally, radially or angularly along this axis, the rotor comprising a magnetic weight which, by moving, closes one or more reed envelopes such that when the key is inserted into the rotor, said key moves the rotor and the magnetic weight in translation which has the effect of closing the relay commanding the connection to the main power supply.

It is also advantageous that the switches are Hall effect sensors.

BRIEF DESCRIPTION OF THE FIGURES

An embodiment of the invention will be described below as a nonlimiting example, making reference to the appended drawings in which.

DETAILED DESCRIPTION OF THE NONLIMITING EMBODIMENTS OF THE INVENTION

Figure 1:
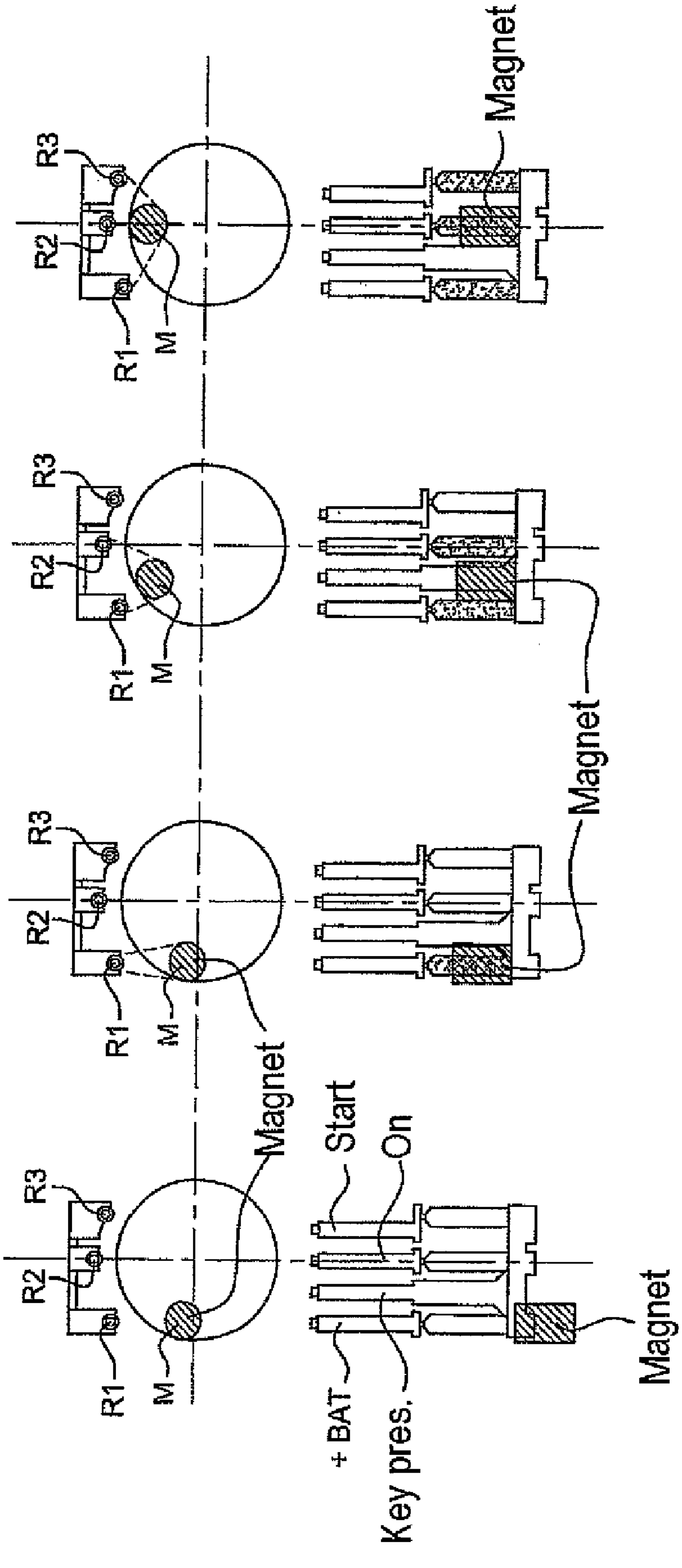
FIG. 1 shows schematically the four positions of a magnetic weight relative to three reed envelopes commanding the functions of ignition and start, after verification of the presence of the key.
Figure 2:
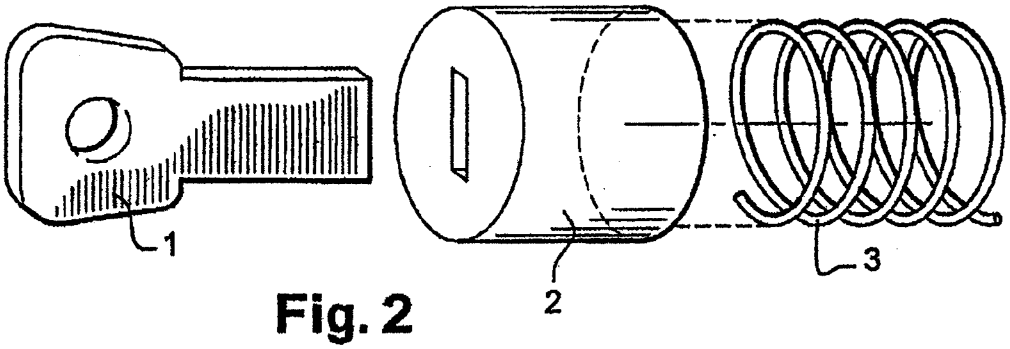
FIG. 2 shows schematically the key and the lock according to the invention when the key is outside the lock.
Figure 3:
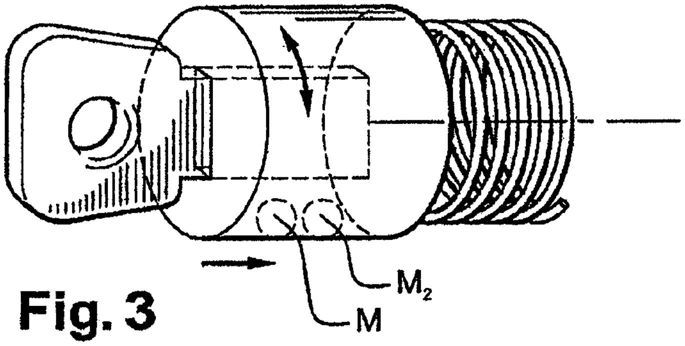
FIG. 3 shows schematically the key in dashed lines placed inside the lock.

In the example illustrated in FIGS. 1, 2 and 3, the lock uses three reed envelopes (R1), (R2) and (R3), arranged in an antitheft stator of a motor vehicle. A magnetic weight (M) is placed in the rotor of this antitheft element. Further, as shown particularly in FIG. 3, a second magnetic weight ($M_2$) may be included with the (first) magnetic weight (M), if desired, such as by disposing the second magnetic weight ($M_2$) adjacent to the (first) magnetic weight (M). The key (1) can enter the lock (2). A spring (3) makes it possible to draw back the bolt of the lock when the key is removed. Pushing the key into the lock moves the magnetic weight M toward the bottom of the lock, which causes the closure of the first reed envelope F1.

In position D (key removed), the weight (M) is placed sufficiently far forward from the reed envelopes to command no ignition.

In position C (key inserted), the insertion of the key has the effect of pushing the weight (M) further into the antitheft element and of moving this weight closer to the first reed envelope (R1), which has the effect of switching the relay R1 to the closed position, which has the effect of connecting the system to the onboard electric power supply.

In position 1, after the key has been turned, the rotor and the weight are rotated bringing this weight closer to the reed envelopes R1 and R2, which has the effect of closing the switches of the relays R1 and R2, which has the effect of turning the ignition on.

In position II, after the ignition key has been turned a little more, the rotor rotates a little more, moving the weight (M), which brings it closer to the relays R1, R2 and R3, which has the effect of closing the circuit and supplying the starter with electric energy.

It can therefore be seen that, if the key is not present in the lock, and if the three relays are mounted in series, even in the case of an untoward sticking of a reed relay (R1 or R2 or R3), the starter is not energized.

The device according to the invention makes it possible to improve the reliability of the system of antitheft and protection against premature starts. This device may be extended to all systems that must safely command particular functionalities of machines. This device, according to the invention, is not limited to the examples described above, but may be modified in the context of the claims without changing the scope of the latter.

The invention claimed is:

1. A key-operated lock device comprising:

a lock, a key designed operable to actuate said lock, an electronic system commanded by said key, an electric power supply communicating the electric power necessary to operate said electronic system, and detecting means for detecting the presence or absence of said key, wherein the detecting means is operable to command the connection with the electric power supply of said electronic system only if the key is present in, or close to, the lock, and wherein the key-operated lock device comprises a plurality of relays that are mounted in series and are configured to be activated successively while the key is rotated such that, even in the case of an untoward sticking of one of the plurality of relays, the starter is not energized if the key is absent.

2. The key-operated lock device as claimed in claim 1, wherein the detecting means comprises an electric contact which is placed in the closed position when the key is inserted into the lock.

3. The key-operated lock device as claimed in claim 1, wherein the detecting means comprises a small magnetic weight which, by moving, closes at least one of the plurality of relays sensitive to magnetic fields.

4. The key-operated lock device as claimed in claim 3, wherein the small magnetic weight is incorporated into the key.

5. The key-operated lock device as claimed in claim 3, wherein said small magnetic weight is incorporated into an antitheft element.

6. The key-operated lock device as claimed in claim 1, wherein the detecting means is incorporated inside a motor vehicle antitheft bolt comprising a rotor operable to rotate about an axis inside a stator and to move longitudinally, radially or angularly along the axis, the rotor comprising a magnetic weight which, by moving, closes one or more reed envelopes such that when the key is inserted into the rotor, said key moves the rotor and the magnetic weight in translation such that at least one of the plurality of relays commanding the connection to the electric power supply is closed.

7. The key-operated lock device as claimed in claim 1, wherein the detecting means further commands energizing at least one of ambient lighting, radio, GPS system, or telephone.

8. The key-operated lock device as claimed in claim 1, comprising Hall effect sensors as switches.

9. The key-operated lock device as claimed in claim 6, wherein the detecting means is a mechanical system based on a longitudinal movement of the magnetic weight which bring the magnetic weight closer to the reed envelopes which will then be activated by rotation of the bolt of the lock only if the magnetic weight has previously been pushed into the lock by the key.

10. The key-operated lock device as claimed in claim 1, further comprising a second magnetic weight disposed adjacent to the first magnetic weight.

11. The key-operated lock device as claimed in claim 2, wherein the detecting means comprises a small magnetic weight which, by moving, closes at least one of the plurality of relays sensitive to magnetic fields.

12. The key-operated lock device as claimed in claim 2, wherein the detecting means is incorporated inside a motor vehicle antitheft bolt comprising a rotor operable to rotate about an axis inside a stator and to move longitudinally, radially or angularly along the axis, the rotor comprising a magnetic weight which, by moving, closes one or more reed envelopes such that when the key is inserted into the rotor, said key moves the rotor and the magnetic weight in translation such that at least one of the plurality of relays commanding the connection to the electric power supply is closed.

13. A key-operated lock device comprising:

a lock;

a key operable to actuate said lock;

an electronic system commanded by said key;

an electric power supply communicating electric power necessary to operate said electronic system; and a detection device operable to the presence or absence of said key, the detection device comprising:

an electric contact which is placed in the closed position when the key is inserted into the lock, and a small magnetic weight which, by moving, closes a relay sensitive to magnetic fields;

wherein said detection device is operable to command the connection with the electric power supply of said electronic system only if the key is present in, or close to, the lock, and wherein the key-operated lock device comprises a plurality of relays that are mounted in series and are configured to be activated successively while the key is rotated such that, even in the case of an untoward sticking of one of the plurality of relays, the starter is not energized if the key is absent.

14. A key-operated lock device comprising:

a lock;

a key operable to actuate said lock;

an electronic system commanded by said key;

an electric power supply communicating electric power necessary to operate said electronic system; and a detection device operable to the presence or absence of said key, wherein said detection device is operable to command the connection with the electric power supply of said electronic system only if the key is present in, or close to, the lock, wherein the detecting device is incorporated inside a motor vehicle antitheft bolt comprising a rotor operable to rotate about an axis inside a stator and to move longitudinally, radially or angularly along the axis, the rotor comprising a magnetic weight which, by moving, closes one or more reed envelopes such that when the key is inserted into the rotor, said key moves the rotor and the magnetic weight in translation such that the relay commanding the connection to the electric power supply is closed, and wherein the key-operated lock device comprises a plurality of relays that are mounted in series and are configured to be activated successively while the key is rotated such that, even in the case of an untoward sticking of one of the plurality of relays, the starter is not energized if the key is absent.

* * * * *